(12) United States Patent
Clark

(10) Patent No.: US 6,662,548 B1
(45) Date of Patent: Dec. 16, 2003

(54) JET BLADE EJECTOR NOZZLE

(75) Inventor: Larry T. Clark, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 167 days.

(21) Appl. No.: 09/671,870

(22) Filed: Sep. 27, 2000

(51) Int. Cl.⁷ .................................................. F02K 3/02
(52) U.S. Cl. ....................... 60/204; 60/226.1; 60/39.183
(58) Field of Search ................................ 60/204, 226.1, 60/262, 39.183; 181/213

(56) References Cited

U.S. PATENT DOCUMENTS

| | | | |
|---|---|---|---|
| 3,024,601 A | * | 3/1962 | Nash ............................ 60/35.54 |
| 3,572,463 A | | 3/1971 | Eschenburg |
| 3,574,477 A | * | 4/1971 | Dolf ............................. 415/60 |
| 3,742,711 A | * | 7/1973 | Timms ......................... 60/226 |
| 3,820,630 A | | 6/1974 | Huff |
| 3,830,431 A | | 8/1974 | Schwartz |
| 4,501,393 A | | 2/1985 | Klees et al. |
| 4,754,924 A | | 7/1988 | Sahnnon |
| 4,835,961 A | | 6/1989 | Presz, Jr. et al. |
| 5,203,164 A | | 4/1993 | Paulson |
| 5,872,342 A | * | 2/1999 | Gysling ........................ 181/277 |

OTHER PUBLICATIONS

"Experimental Investigation of a Nonsteady Flow Thrust Augmenter", Journal of Propulsion and Power, American Institute of Aeronautics and Astronautics, vol. 12 No. 4 Jul. 1, 1996.
K.H. Honenmser & J.L. Porter, *Contribution to the Theory of Rotary Jet Flow Induction*, vol. 3 J. Aircraft No. 4 (1966).
K. H. Hohenemser, *Flow Induction by Rotary Jets*, vol. 3 J. Aircraft No. 1 (1966).

* cited by examiner

*Primary Examiner*—Ehud Gartenberg
(74) *Attorney, Agent, or Firm*—Harness Dickey & Pierce P.L.C.

(57) ABSTRACT

A jet engine assembly having a jet engine and an unsteady flow ejector. The unsteady flow ejector segregates the exhaust flow from the jet engine into a plurality of rotating high velocity, low density jets and a plurality of rotating low pressure voids. The low pressure voids are employed to entrain at least a portion of a secondary flow of air which is mixed with the jets to produce a mixed flow having a relatively higher flow rate and a relatively lower velocity than the exhaust flow. A method for attenuating the noise that is produced by the exhaust flow of a jet engine is also provided.

9 Claims, 5 Drawing Sheets

JET BLADE EJECTOR NOZZLE

BACKGROUND OF THE INVENTION

1. Technical Field

The present invention relates generally to flow mixing methods and devices for jet engines and more particularly to a device and method for mixing flows to attenuate noise and augment thrust.

2. Background Art

Flow mixing devices have attracted significant attention since the invention of the jet engine. One application for these devices is related to the attenuation of the noise that is produced by the exhaust during the operation of the jet engine. Since noise generation is proportional to the velocity of the jet engine taken to the sixth or eighth power depending upon the pressure ratio of the nozzle, reductions in the velocity of the exhaust have the potential to significantly attenuate noise.

Static mixers and steady flow ejectors have been employed to breakup the exhaust flow into smaller jets to enhance the rate with which the exhaust flow is mixed with the ambient flow field. In operation, these devices create large shear areas between the jets and the ambient flow field, causing the streams to interact at their interfaces and exchange shear force and momentum. As this process is irreversible in nature, the operation of these devices substantially reduced the efficiency of the engine. Consequently, it was possible to achieve a similar degree of noise attenuation by simply omitting the flow mixer and reducing the power level of the jet engine.

Flow mixing devices have also been investigated due to their potential to augment the thrust that is produced by the engine. Several problems have been noted, however, when these devices have also been employed to attenuate noise. In the case of steady flow ejectors, the ram drag that results from the drawing of ambient air into the ejector for mixing with the exhaust flow overtakes the level of augmented thrust that is produced when the jet engine is operated at a relatively low speed (i.e., approximately Mach 0.3 to Mach 0.4). As such, it has not been possible to employ these steady flow ejectors in an efficient manner, particularly where the jet engine is to operate at a supersonic speed.

In view of the drawbacks of steady flow ejectors, a second kind of ejector has been proposed to take advantage of the unsteady flow physics. The known unsteady flow ejectors produce a primary jet having a relatively large radial velocity component that must be turned back to the axial direction in order to provide thrust. This turning must be done by the secondary flow at a cost of its axial momentum, thereby generating a substantial loss of the available propulsive energy.

SUMMARY OF THE INVENTION

In one preferred form, the present invention provides a jet engine assembly having a turbofan jet engine and an unsteady flow ejector. The turbofan jet engine has an engine core for powering a fan. The engine core produces an engine core flow and the fan producing a fan flow. The unsteady flow ejector has a multi-bladed rotor which is disposed within the engine core flow and rotates in response to a transfer of momentum from the engine core flow. Rotation of the rotor within the engine core flow generates a plurality of high velocity, low density rotating jets and a plurality of low pressure voids, with each of the voids being spaced between two of the jets. Each of the voids entrains a portion of the fan flow which then mixes with the jets and produces a mixed flow having a relatively higher flow rate and a relatively lower velocity than the engine core flow.

In another preferred form, the present invention provides a jet engine assembly having an inlet, a turbojet engine and an unsteady flow ejector. The inlet provides an inlet flow of air to the turbojet engine. The turbojet engine receives at least a portion of the inlet flow, employing it to generate a propulsive primary flow. The unsteady flow ejector includes a multi-bladed rotor that is disposed within the primary flow and rotates in response to a transfer of momentum from the primary flow. The rotor employs the primary flow to generate a plurality of high velocity, low density rotating jets and a plurality of low pressure voids, with each of the voids being spaced between two of the jets and being selectively employable to entrain a secondary flow of air into voids. The jet engine assembly can be operated in a first mode wherein the secondary flow is a flow of ambient air that is introduced directly into the unsteady flow ejector to mix the primary and secondary flows so as to attenuate the noise level of the air exiting the turbojet engine.

In another preferred form, the present invention provides a method for reducing the noise emitted by a flow of exhaust from an outlet of a jet propulsion engine. The method includes the steps of segregating the exhaust flow into a plurality of rotating high velocity, low density jets and a plurality of rotating low pressure voids; and employing the low pressure voids to entrain at least a portion of a secondary flow of air, the jets and the entrained secondary flow mixing to produce a mixed flow having a relatively higher flow rate and a relatively lower velocity than the exhaust flow.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
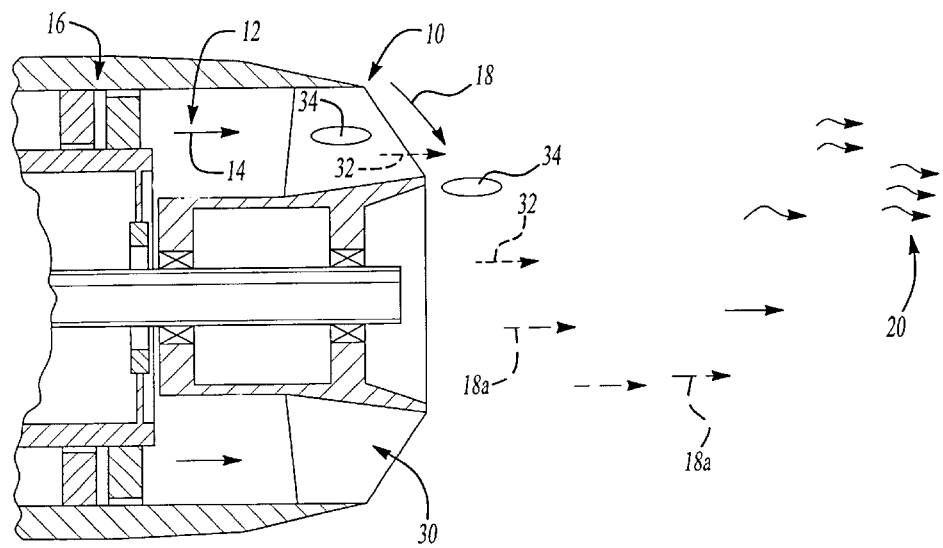
FIG. 1 is a schematic illustration of an ejector constructed in accordance with the teachings of a preferred embodiment of the present invention.

With reference to FIG. 1 of the drawings, an unsteady flow ejector constructed in accordance with the teachings of the present invention is generally indicated by reference numeral 10. The unsteady flow ejector 10 is operable for mixing a high velocity primary air flow 12, such as an exhaust stream 14 produced by a turbojet engine 16, and a lower velocity secondary air flow 18 to produce a mixed flow 20 having a lower velocity than that of the primary air flow 12. Operation of the unsteady flow ejector 10 in this manner may be employed to attenuate the noise that is generated by the primary air flow 12 and/or to extract work to augment engine thrust.

The unsteady flow ejector 10 is illustrated to include a rotor 30 which is disposed at least partially in a primary air flow 12. The rotor 30 is illustrated to be free-spinning, but could be coupled for rotation with another component, such as the final turbine stage of a jet engine (not shown). Rotation of the rotor 30 in the primary air flow 12 generates a plurality of rotating high pressure, high velocity jets 32 and a plurality of rotating low pressure voids 34, with each of the voids 34 being spaced between two of the jets 32. Each of the jets 32 flows through the unsteady flow ejector 10 in the thrust direction so as not to require the use of additional flow momentum to re-direct the mixed flow 20. Stated another way, although the pattern of total temperature, pressure and other scalar properties tends to move in a spiral manner, flow velocity is directed axially in the thrust direction.

Each of the voids 34 is operable for entraining a portion 18a of the secondary air flow 18. Essentially, the low static pressure of each of the voids 34 causes a portion 18a of the secondary flow 18 to rush into and fill each of the voids 34. Entrainment of the secondary flow 18 is dominated by static pressure momentum interchange which occurs in an essentially isentropic manner.

Accordingly, the losses that result from the mixing process are relatively small as compared to other known mixing devices and ejectors which employ shear forces to mix flows.

The temperature and density differentials between the jets 32 and the entrained portion 18a of the secondary flow 18 set up a phenomenon known as Taylor Instability, which causes the primary air flow 12 and the entrained portion 18a of the secondary flow 18 to mix. Mixing occurs when the interface instability causes the jets 32 and the entrained portion 18a of the secondary flow 18 to breakup as the low-density jets 32 push through the higher density entrained portion 18a of the secondary flow 18.

In order to place the unsteady flow ejector 10 behind the turbojet engine 16, the unsteady flow ejector 10 must be able to entrain the secondary flow 18 from the ambient by turning it from the free stream direction radially down into an ejector-mixer and then turn it back into the thrust direction. This turning must be done as efficiently as possible. There must be no flow separation. Furthermore, the jets 32 must be smoothly formed from the primary flow 12 with minimum losses. These jets 32 must flow in the thrust direction so that no additional flow momentum will be needed to align them in the thrust direction.

Figure 2A:
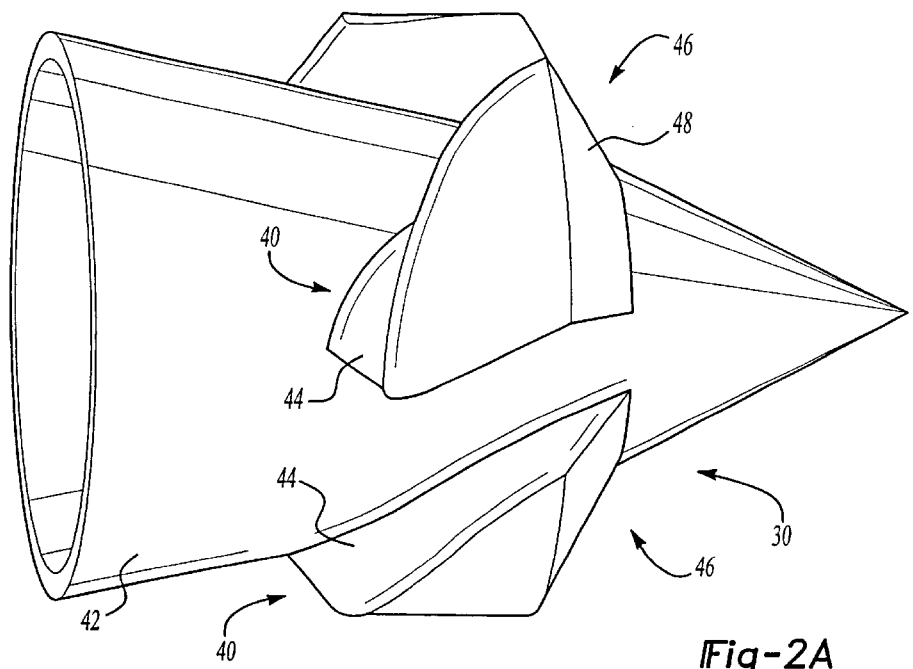
FIG. 2A is a perspective view of a portion of the ejector of FIG. 1 illustrating the ejector rotor.

In FIG. 2A, the rotor 30 is illustrated to have a plurality of blades 40 and a hub 42. Each of the blades 40 has a face portion 44 and an end portion 46 and is fixedly coupled to the hub 42. The face portion 44 has an airfoil shape which guides the primary flow 12 in an efficient manner, to the exit of the unsteady flow ejector 10. In the example provided, the rotor 30 has four blades 40, with the rotor face angle being about 60° and having an open area ratio for the jets 32 of about 33%. Those skilled in the art will understand, however, that the configuration of the rotor 30 (e.g., the quantity of the blades 40, the shape of the blades 40 and the rotational speed of the rotor 30) must allow enough time and room for the entrained portion 18a of the secondary flow 18 to move into the low pressure voids 34.

The end portion 46 is uniform in the circumferential direction so that no torque, other than that which results from surface skin friction, is applied to the rotor 30 as it rotates. In the particular embodiment illustrated, the end portion 46 has a conical downstream face 48. Configuration of the rotor 30 in this manner causes the free-spinning rotor 30 to rotate at a speed which balances the static pressure in the circumferential direction between the suction and pressure surfaces of the blades 40. Accordingly, the speed of the rotor 30 is directly related to the flow rate of the primary flow 12 and no runaway conditions are possible.

Figure 2B:
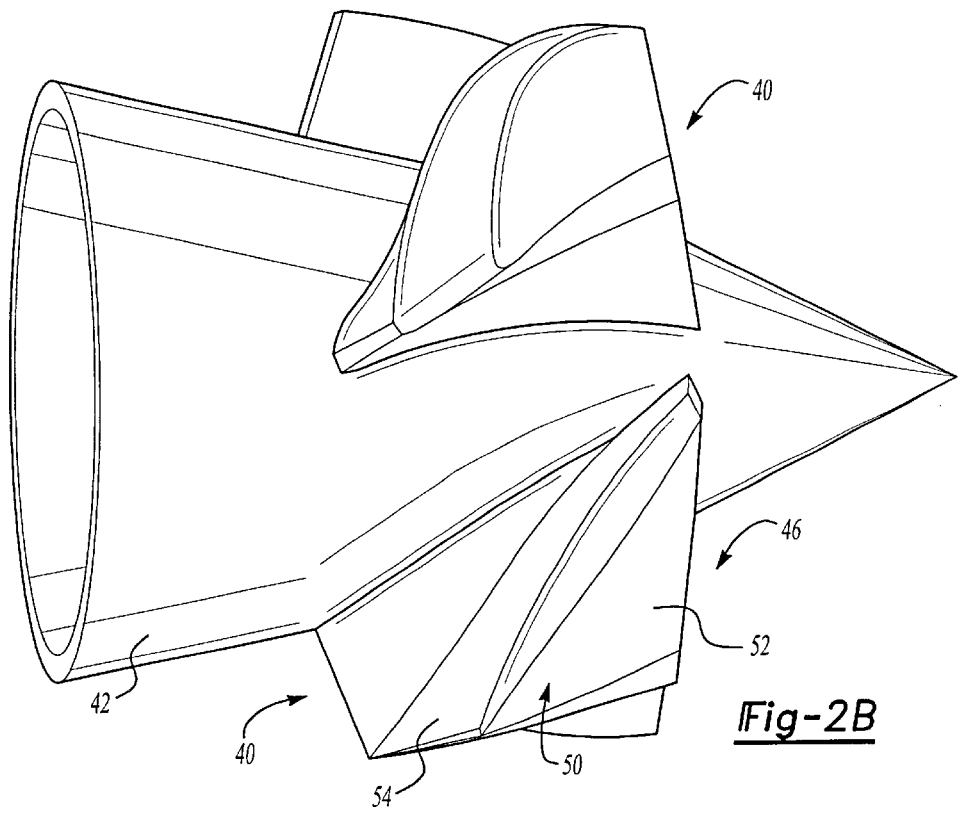
FIG. 2B is a perspective view similar to that of FIG. 2A but illustrating another rotor configuration.

As illustrated in FIG. 2B, each of the blades 40 of the rotor 30 may additionally include a relieved portion 50. In the example provided, each of the relieved portions 50 includes a cavity 52 that emanates from a point on the outer surface 54 of a respective one of the blades 40 and tapers both downwardly toward the hub 42 and outwardly toward the end portion 46. During the operation of rotor 30, the cavity 52 operates as a flow channel for the secondary flow 18 to increase the rate with which the secondary flow 18 is entrained.

EXAMPLE I

Jet Engine Assembly With Turbofan Jet Engine

Figure 3A:
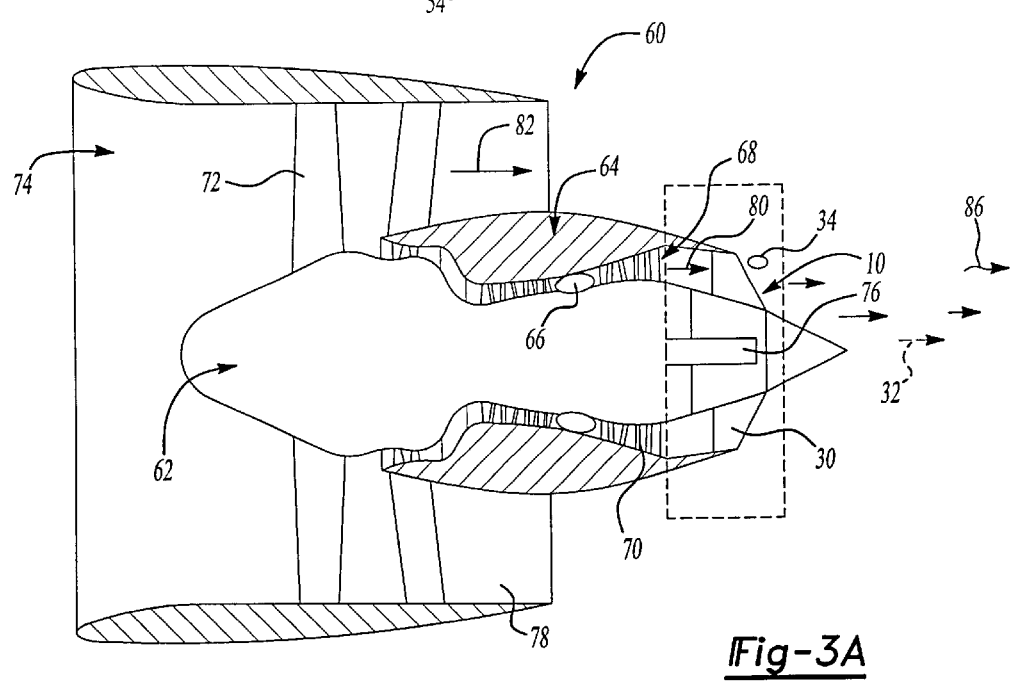
FIG. 3A is a schematic illustration of the ejector of the present invention in operative association with a short-duct turbofan engine.
Figure 3B:
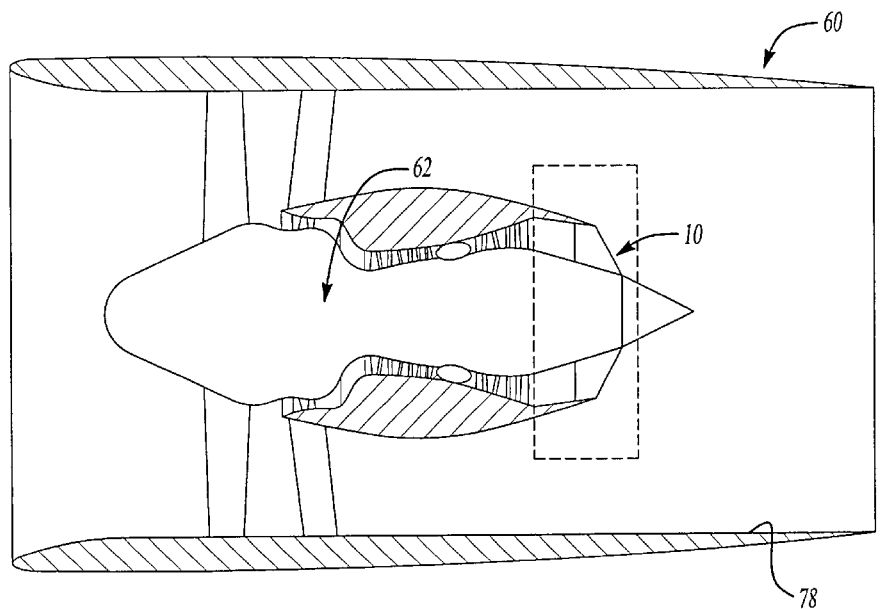
FIG. 3B is a schematic illustration of the ejector of the present invention in operative association with a long-duct turbofan engine.

FIG. 3A illustrates a jet engine assembly 60 having a turbofan jet engine 62 and the unsteady flow ejector 10. The turbofan jet engine 62 is conventional and includes a turbojet engine core 64 having a combuster 66 and a turbine 68 with a plurality of turbine stages 70. The turbine 68 is employed to operate a relatively large fan 72 that is mounted forwardly of the turbojet engine core 64. The fan 72 adds energy to the air that is taken in through the inlet 74 of the jet engine assembly 60, causing the air to be expelled from the jet engine assembly 60 at a rate of speed that is relatively faster than the speed with which it enters the jet engine assembly 60. The unsteady flow ejector 10 replaces the conventional nozzle (not shown) that is typically mounted aft of the turbojet engine core 64. The rotor 30 is mounted in a free-spinning manner preferably on one of the engine shafts 76, although a dedicated shaft arrangement (not shown) could also be employed. In the particular example provided, the unsteady flow ejector 10 is also mounted outside of the generally hollow duct 78 in which the turbofan engine 62 is disposed. Those skilled in the art will understand, however, that the particular embodiment illustrated is not intended to be limiting in any manner and that the unsteady flow ejector 10 may alternatively be mounted inside the duct 78 as illustrated in FIG. 3B.

During the operation of the jet engine assembly 60, the turbojet engine core 64 produces an engine core flow 80 and the fan 72 produces a propulsive fan flow 82. The rotor 30 of the unsteady flow ejector 10 is disposed within the engine core flow 80 (i.e., the primary flow), causing the rotor 30 to rotate in response to a transfer of momentum from the engine core flow 80. Rotation of the rotor 30 within the engine core flow 80 generates the plurality of high velocity, low density rotating jets 32 and the plurality of low pressure voids 34 in the manner that is discussed above. The voids 34 then entrain a portion of the fan flow 82 (i.e., the secondary flow), causing the engine core flow 80 and the fan flow 82 to mix and produce a mixed flow 86 having a relatively higher flow rate and a relatively lower velocity than the engine core flow 80. As such, operation of the unsteady flow ejector 10 attenuates the noise produced by the operation of the turbojet engine core 64.

EXAMPLE II

Jet Engine Assembly With Turbojet Engine

Figure 4A:
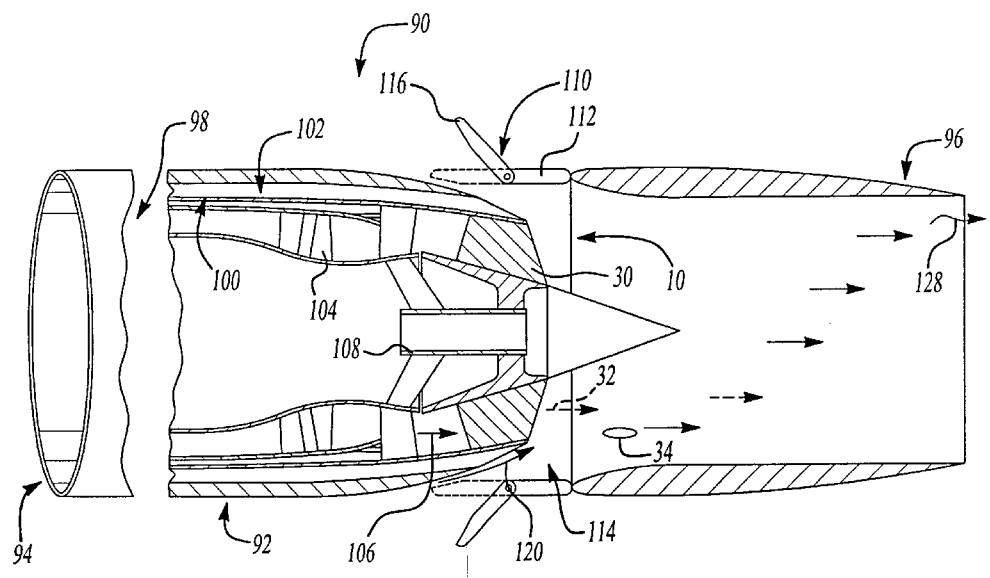
FIG. 4A is a schematic cross-sectional view of a jet engine assembly equipped with the ejector of the present invention, the jet engine assembly being configured in a take-off mode.

FIG. 4A illustrates a jet engine assembly 90 having a turbo jet engine 92, the unsteady flow ejector 10, a conventional inlet 94 and a conventional variable geometry nozzle 96. The turbojet engine 92 is conventional and includes a compressor 98, a combuster 100 and a turbine 102 with a plurality of turbine stages 104. Air is directed from the inlet 94 through the compressor 98 and into the combuster 100 where it is mixed with fuel and the mixture is burned. The hot gasses that exit the combuster 100 are expanded through the turbine 102 and exit the turbojet engine 92 as a propulsive exhaust flow 106.

Figure 5:
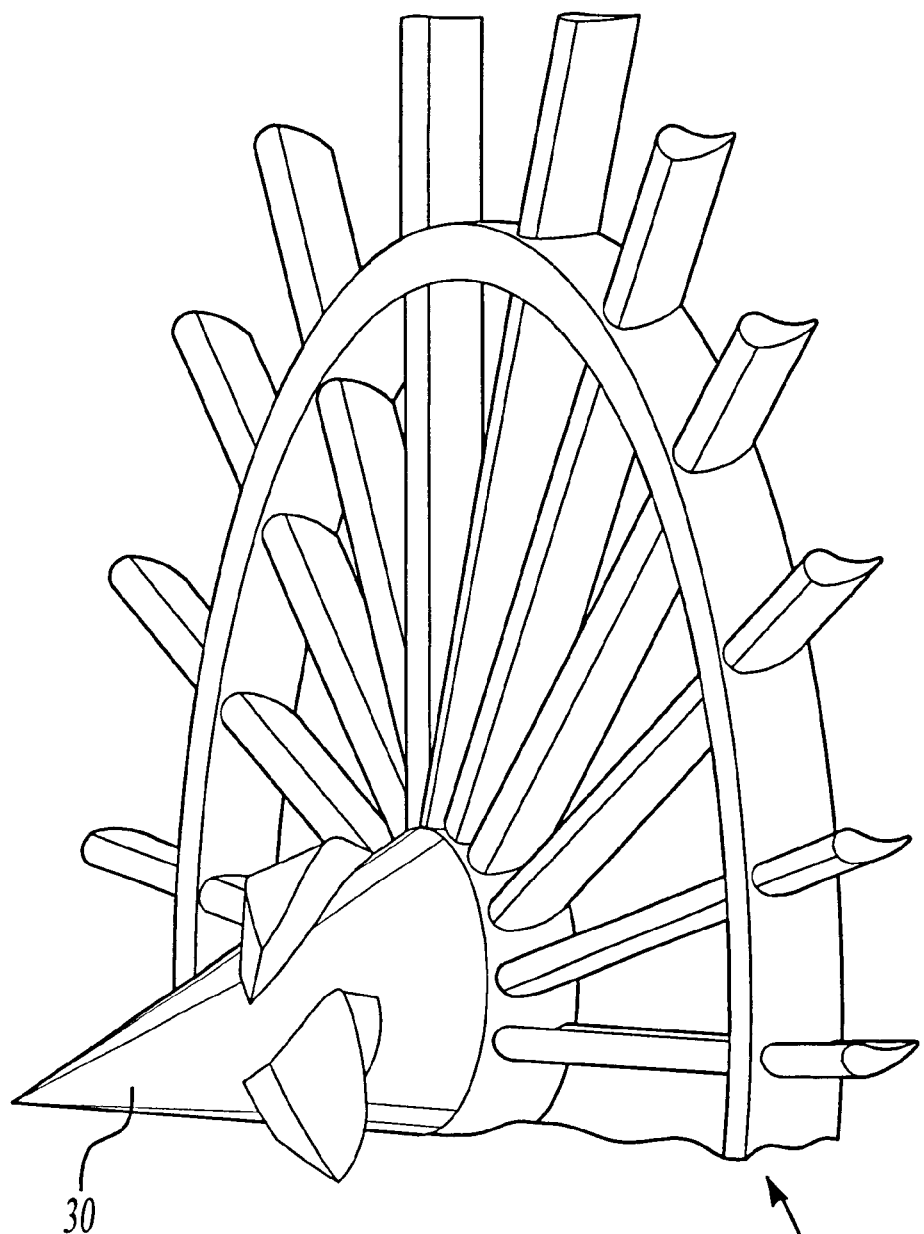
FIG. 5 is a schematic illustration of an ejector constructed in accordance with the teachings of an alternate embodiment of the present invention.

The unsteady flow ejector 10 is mounted aft of the turbojet engine 92. The rotor 30 is mounted in a free-spinning manner preferably on one of the engine shafts 108 forward of a cowling assembly 110 that has a cowling member 112 that defines at least one inlet aperture 114. At least one closure member 116 is movably coupled to the cowling member 112 and is selectively positionable between an open position and a closed position. The operation of cowling assembly 110 will be discussed below in greater detail. Alternatively, the rotor 30 may be mounted to a dedicated shaft arrangement (not shown) or to one of the turbine stages 104 (FIG. 5). In this latter arrangement, the rotor 30 may be coupled to the turbine stage 104 so that it rotates at the same rotational speed as that of the turbine stage 104 or, with additional gearing, so that it rotates at a rotational speed that is different than that of the turbine stage 104.

Returning to FIG. 4A, the jet engine assembly 90 is operable in a first mode during take-off situations, for example, wherein the closure member 116 is positioned in the open position, exposing the unsteady flow ejector 10 to a flow of ambient air 120 (i.e. a secondary flow). The rotor 30 of the unsteady flow ejector 10 is disposed within the exhaust flow 106 (i.e., the primary flow), causing the rotor 30 to rotate in response to a transfer of momentum from the exhaust flow 106. Rotation of the rotor 30 within the exhaust flow 106 generates the plurality of high velocity, low density rotating jets 32 and the plurality of low pressure voids 34 in the manner that is discussed above. The voids 34 then entrain a portion of the ambient air flow 120 (i.e., the secondary flow), causing the exhaust flow 106 and the ambient air flow 120 to mix and produce a mixed flow 128 having a relatively higher flow rate and a relatively lower velocity than the exhaust flow 106. In the particular example provided, amount of air contained in the ambient air flow 120 was about 110% of the amount of air contained in the exhaust flow 106. The mixed flow 128 is then discharged through the variable geometry nozzle 96. Operation of the unsteady flow ejector 10 attenuates the noise produced by the operation of the turbojet engine 92, as well as reduces the temperature of the air flowing out of the variable geometry nozzle 96.

Preferably, the unsteady flow ejector 10 is operated with the closure member 116 in the open position until the speed of the aircraft to which the jet engine assembly 90 is coupled exceeds a predetermined flight speed (e.g., about Mach 0.8). After this point, the aerodynamic drag associated with the direction of the ambient air flow 120 into the unsteady flow ejector 10 becomes sufficiently large so as to outweigh the noise attenuation benefits of the unsteady flow ejector 10 as operated in the first mode. Accordingly, the closure member 116 may thereafter be positioned in the closed position.

Figure 4B:
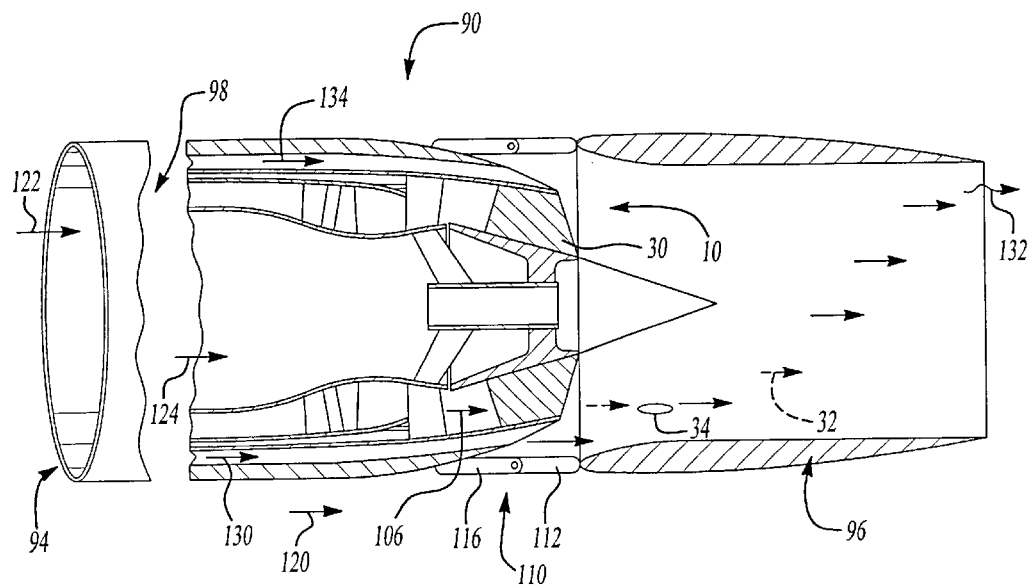
FIG. 4B is a schematic cross-sectional view similar to that of FIG. 4A but illustrating the jet engine assembly as configured in a transonic mode.

In FIG. 4B, the jet engine assembly 90 is illustrated to be operable in a second mode during transonic situations. In the second mode, the closure member 116 is positioned in the closed position so that the unsteady flow ejector 10 is not exposed to the ambient air flow 120. As with the operation of the unsteady flow ejector 10 in the first mode, the transfer of momentum from the exhaust flow 106 causes the rotor 30 to rotate and generate the plurality of high velocity, low density rotating jets 32 and the plurality of low pressure voids 34. In contrast to the first mode, the second mode utilizes a flow of bypass air 130 which is directed from the inlet 94 around the combuster 100 and into the unsteady flow ejector 10. The bypass flow 130 is generated from a flow mismatch between a supersonic inlet flow 122 and an engine intake flow 124, with the bypass air flow 130 being the difference between the supersonic inlet flow 122 and the engine intake flow 124.

The voids 34 then entrain a portion of the bypass flow 130 (i.e., the secondary flow), causing the exhaust flow 106 and the bypass flow 130 to mix and produce a mixed flow 132 having a relatively higher flow rate and a relatively lower velocity than the exhaust flow 106. The mixed flow 132 is then discharged through the variable geometry nozzle 96. Operation of the unsteady flow ejector 10 in the second mode reduces the temperature of the air flowing out of the variable geometry nozzle 96 and provides an augmented level of thrust. This later benefit stems in part from a reduction in drag that is normally associated with the bypass flow 130 as the bypass flow 130 is normally ejected without having had any work extracted from it. Furthermore, the extra flow through the internal parts of the variable geometry nozzle 96 allow for a shallower boat tail angle and as such, achieve lower aerodynamic drag. An additional benefit of this use of the bypass flow 130 is that it may be used to cool portions of the unsteady flow ejector 10 and the variable geometry nozzle 96 since the temperature of the bypass flow 130 is much cooler than that of the exhaust flow 106.

Preferably, the secondary flow that is directed to the unsteady flow ejector 10 during the operation of the jet engine assembly 90 in the second mode also includes a component that is associated with a boundary-layer bleed flow 134. The boundary-layer bleed flow 134 results from the process of decelerating all or a portion of the supersonic inlet flow 122 prior to its entering the compressor 98 via a series of oblique shocks. The low momentum flow in the boundary layer interacts with these shocks, growing in thickness, which in some situations, can lead to flow separation. The boundary-layer bleed flow 134 is employed to reduce the mass and thickness of the boundary layer to help .maintain a uniform flow to the compressor 98. In the particular embodiment illustrated, the boundary-layer bleed flow 134 is combined with the bypass flow 130 to permit work to be extracted from it prior to its ejection from the jet engine assembly 90. In the example provided, the amount of air in the secondary flow (i.e., the bypass flow 130 and the boundary-layer bleed flow 134) was about 30% of the amount of air in the exhaust flow 106.

Figure 4C:
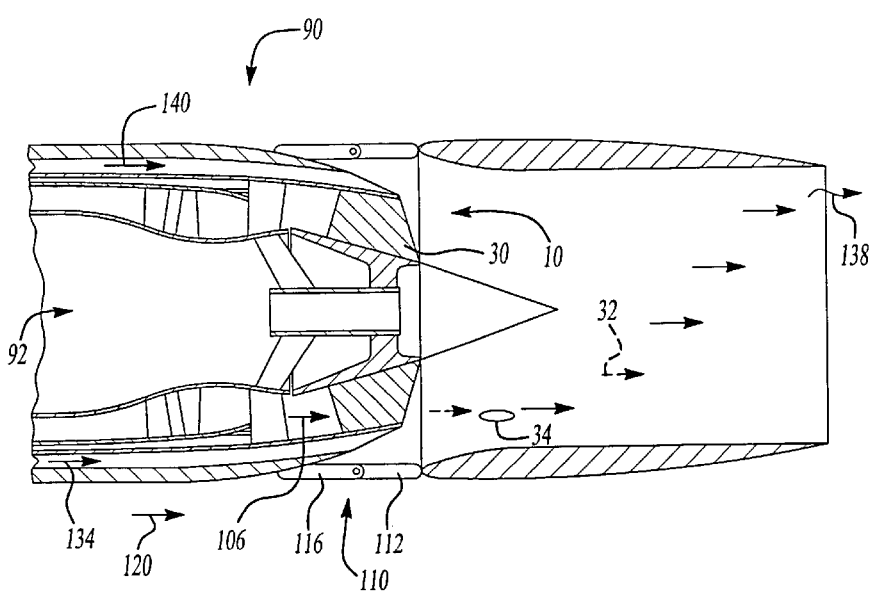
FIG. 4C is a schematic cross-sectional view similar to that of FIG. 4A but illustrating the jet engine assembly as configured in a supersonic mode.

In FIG. 4C, the jet engine assembly 90 is illustrated to be operable in a third mode during supersonic situations. In the third mode, the closure member 116 is positioned in the closed position so that the unsteady flow ejector 10 is not exposed to the ambient air flow 120. As with the operation of the unsteady flow ejector 10 in the first mode, the transfer of momentum from the exhaust flow 106 causes the rotor 30 to rotate and generate the plurality of high velocity, low density rotating jets 32 and the plurality of low pressure voids 34. In contrast to the first mode, the third mode utilizes the boundary-layer bleed flow 134 as the primary constituent of the secondary flow. The voids 34 entrain a portion of the boundary-layer bleed flow 134, causing the exhaust flow 106 and the boundary-layer bleed flow 134 to mix and produce a mixed flow 138 having a relatively higher flow rate and a relatively lower velocity than the exhaust flow 106. The mixed flow 138 is then discharged through the variable geometry nozzle 96. Operation of the unsteady flow ejector 10 in the third mode reduces the temperature of the air flowing out of the variable geometry nozzle 96 and provides an augmented level of thrust. This later benefit stems from a reduction in drag that is normally associated with the boundary-layer bleed flow 134 as the boundary-layer bleed flow 134 is normally ejected without having had any work extracted from it.

Preferably, the secondary flow that is directed to the unsteady flow ejector 10 during the operation of the jet engine assembly 90 in the third mode also includes a component that is associated with an engine cooling air flow 140. The engine cooling air flow 140 is employed when the turbojet engine 92 is operating at supersonic speeds; the engine cooling air flow 140 is a flow of air that is directed through the jet engine assembly 90 to extract heat. In the particular embodiment illustrated, the engine cooling air flow 140 is combined with the boundary-layer bleed flow 134 to permit work to be extracted from it prior to its ejection from the jet engine assembly 90. In the example provided, the amount of air in the secondary flow (i.e., the boundary-layer bleed flow 134 and the cooling air flow 140) was about 9% of the amount of air in the exhaust flow 106.

Those skilled in the art will understand that the unsteady flow ejector 10 may be operated in the second and third modes without the benefit of the secondary flow (i.e., without the bypass flow 130 or the boundary-layer bleed flow 134 in the second mode and without the boundary-layer bleed flow 134 and the cooling air flow 140 in the third mode). Operation of the jet engine assembly 90 in this manner would, however, necessitate that the various flows be spilled or dumped overboard to the ambient air flow and their ram drag would be simply unrecovered.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for reducing the noise emitted by a flow of exhaust from an outlet of a jet propulsion engine having a turbine with a plurality of turbine stages, the method comprising the steps of:

segregating the exhaust flow into a plurality of rotating high velocity, low density jets and a plurality of rotating low pressure voids; and employing the low pressure voids to entrain at least a portion of a secondary flow of air, the jets and the entrained secondary flow mixing to produce a mixed flow having a relatively higher flow rate and a relatively lower velocity than the exhaust flow.

2. The method of claim 1, wherein the step of segregating the exhaust flow is performed with a free-spinning rotor mounted to the aft of the exhaust of the jet engine.

3. The method of claim 1, wherein the step of segregating the exhaust flow is performed with a rotor that is mounted to one of the plurality of turbine stages.

4. The method of claim 3, wherein the rotor has a rotational speed that is equal to a rotational speed of an associated one of the turbine stages.

5. The method of claim 1, wherein the rotor is disposed within a cowling assembly having a cowling member and at least one closure member, the cowling member defining an inlet aperture, the at least one closure member being selectively positionable between an open position permitting a flow of ambient air to the rotor and a closed position inhibiting the flow of ambient air to the rotor.

6. The method of claim 5, wherein before the step of employing the low pressure voids to entrain the secondary flow of air, the method includes the steps of:

determining a speed of the jet propulsion engine; and if the speed of the jet propulsion engine is below a predetermined speed, positioning the closure member in the open position.

7. The method of claim 1, wherein the secondary flow includes a boundary-layer bleed flow from a supersonic inlet.

8. The method of claim 1, wherein the secondary flow includes an engine cooling air flow.

9. The method of claim 1, wherein the secondary flow includes a flow of bypass air, the bypass air flow being generated from a flow mismatch between a supersonic inlet flow and an engine intake flow.

* * * * *